(12) United States Patent
Ng et al.

(10) Patent No.: US 12,339,954 B2
(45) Date of Patent: Jun. 24, 2025

(54) HYBRID DEVICE WITH TRUSTED EXECUTION ENVIRONMENT

(71) Applicant: Hong Kong Applied Science and Technology Research Institute Company Limited, Hong Kong (HK)

(72) Inventors: Chi Wai Ng, Tsuen Wan (HK); Chan Fai Lam, Sai Ying Pun (HK); Yun Kau Lee, Yuen Long (HK)

(73) Assignee: HONG KONG APPLIED SCIENCE AND TECHNOLOGY RESEARCH INSTITUTE COMPANY LIMITED, Shatin (HK)

( * ) Notice: Subject to any disclaimer, the term of this patent is extended or adjusted under 35 U.S.C. 154(b) by 237 days.

(21) Appl. No.: 18/327,559

(22) Filed: Jun. 1, 2023

(65) Prior Publication Data
US 2024/0403410 A1   Dec. 5, 2024

(51) Int. Cl.
*G06F 21/79* (2013.01)
*G06F 21/53* (2013.01)
*G06F 21/57* (2013.01)

(52) U.S. Cl.
CPC .............. *G06F 21/53* (2013.01); *G06F 21/57* (2013.01)

(58) Field of Classification Search
CPC ........... G06F 21/53; G06F 21/57; G06F 21/79
See application file for complete search history.

(56) References Cited

U.S. PATENT DOCUMENTS

| | | | |
|---|---|---|---|
| 10,108,800 B1 | 10/2018 | Surdu | ................................ 726/1 |
| 10,325,118 B2 | 6/2019 | Chhabra et al. | |
| 10,878,083 B2 | 12/2020 | Hlaing | |
| 11,151,262 B2 | 10/2021 | Garlati | |
| 2012/0265975 A1 | 10/2012 | Kimelman | ........................ 713/1 |
| 2019/0392156 A1 | 12/2019 | Garlati | |
| 2020/0143041 A1* | 5/2020 | Jung | ........................ G06F 21/71 |
| 2021/0397700 A1 | 12/2021 | Stapf et al. | |
| 2023/0267196 A1* | 8/2023 | Pismenny | ............... G06F 13/28 |
| | | | 726/26 |

FOREIGN PATENT DOCUMENTS

| | | |
|---|---|---|
| CN | 107038128 A | 8/2017 |
| CN | 114117412 A | 3/2022 |
| EP | 3 617 927 A1 | 8/2018 |
| WO | WO-2021238294 A1 * 12/2021 | ............. G06F 21/57 |

OTHER PUBLICATIONS

International Search Report dated Jan. 30, 2024, issued by the China National Intellectual Property Administration in corresponding application PCT/CN2023/098666.
Written Opinion of the International Searching Authority dated Feb. 7, 2024, issued by the China National Intellectual Property Administration in corresponding application PCT/CN2023/098666.

* cited by examiner

*Primary Examiner* — Joseph P Hirl
*Assistant Examiner* — Aayush Aryal
(74) *Attorney, Agent, or Firm* — Stein IP, LLC (57) ABSTRACT

A Hybrid TEE device allows a Trusted Execution Environment (TEE) by incorporating hardware comprising a Cache Purging Controller, a Memory Isolation Gateway, and a Memory Clean Up into a System on a Chip device, a general purpose computing device, or a special purpose or proprietary computing or electronic device. The addition of the hardware enables a method of protecting the Trusted Execution Environment and thus reducing vulnerability to malicious software or other program code.

15 Claims, 5 Drawing Sheets

HYBRID DEVICE WITH TRUSTED EXECUTION ENVIRONMENT

FIELD OF THE INVENTION

The present invention, titled HYBRID DEVICE WITH TRUSTED EXECUTION ENVIRONMENT, but referred to for brevity as the "Hybrid TEE Device," hereafter, relates to a hybrid device incorporating a trusted (secure) execution environment (referred to hereafter as a "TEE") for running program code which reduces the risk that malicious code will be executed by the device via code and data isolation.

DESCRIPTION OF THE RELATED ART

TEEs are known in the programming art: they originally comprised areas of computer memory allocated by the processor in accordance with low-level secure programming instructions which are set aside to only be accessed by "trusted" applications and processes, such that, for example, if multiple applications are being run on a general purpose computing device, applications and processes which have not been subject to some sort of verification or approval procedure are not allowed to access the set-aside memory areas. This approach suffers from multiple vulnerabilities, including but not limited to the fact that the secure programming instructions could themselves be altered or bypassed by malicious software which either by default, by un-secure design, or by malicious activation has sufficient privileges to execute such code.

Some of the factors which have led to exploits related to such malicious code include:
a) inadequate memory isolation among trusted applications and non-trusted applications;
b) vulnerability in the functional module that carries out switching from the secure world to the normal world;
c) cache leakage due to resource sharing among the secure world and the normal world, and within secure world; and
d) information leakage due to the "Rowhammer" vulnerability in certain memory designs In more recent embodiments of TEE, for instance as disclosed in US 2012/0265975 A1, MICROCONTROLLER WITH EMBEDDED SECURE FEATURE, a TEE (also known as a "secure environment") is established by storing a set of security parameters on non-volatile memory which cannot be directly accessed by the processor, but only read by control circuitry which enforces the secure environment and configures it at each power-on of the device. However, this approach still suffers from such well-known issues as cache manipulation or access of the residual memory footprint of an application or process which was itself trusted, but for whatever reason allowed malicious code to read and/or write to its allocated memory for malicious purposes during or after its execution.

The present invention addresses these concerns.

SUMMARY OF THE INVENTION

The present invention provides a Hybrid TEE using hardware elements to secure a TEE for the execution of trusted program code.

According to an embodiment of the present invention, a Hybrid TEE comprises: a device incorporating novel hardware elements including a Cache Purging Controller (CPC,) a Memory Isolation Gateway (MIG) and a Memory Clean Up (MCU) together with TEE-enabled System software.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Though useful for many applications, aspects of the invention will be described as a Hybrid TEE device configured as a "System on a Chip" ("SoC") incorporating a processor, DDR memory, a General Purpose Input/Output interface ("GPIO") and a Flash Memory ("Flash") interface. Additional components usually found on SoC devices, or incorporating the elements of the invention into a more traditional general purpose computing device or dedicated/proprietary computing device, may also be added without detriment to the advantages provided by the invention.

Figure 1:
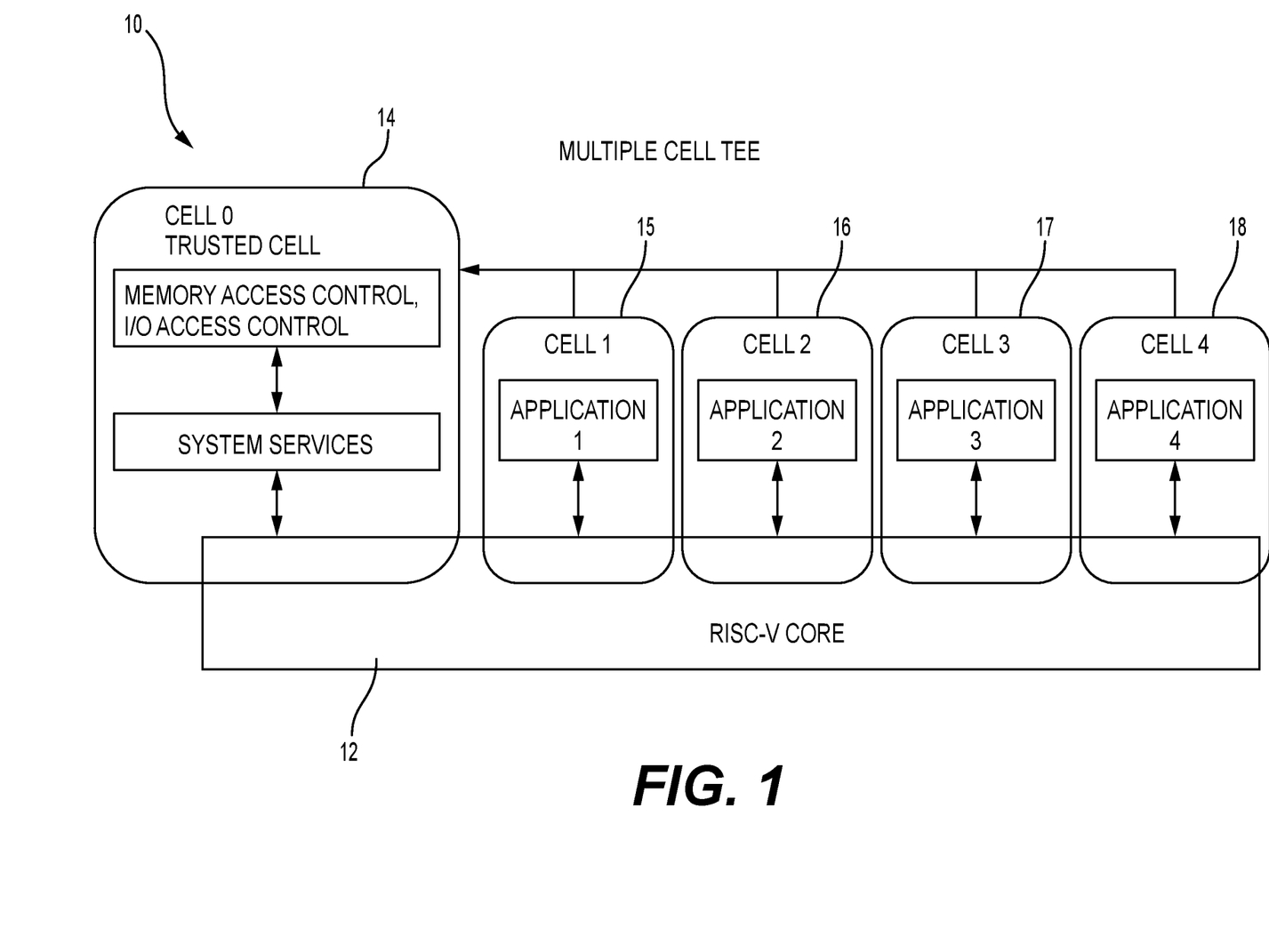
FIG. 1 is an abstract configuration diagram for a memory and a processor core of a TEE device.

By referring to the provided drawings, the Hybrid TEE device can be easily understood. FIG. 1 shows a highly abstracted Hybrid TEE device configuration. A hybrid TEE device 10 comprises a processor core 12 which operates multiple non-trusted processing cells 15, 16, 17, and 18, each of which can execute at least one process (application). Each of the processing cells 15-18 is a virtual element that contains both the program code for an application and the data that application needs to execute. It is required that the processing cells not be able to communicate with each other and/or any corresponding memory or device peripherals except as allowed by the TEE subsystem (not shown, see FIGS. 2 and 3.) A trusted processing cell 14 has a system services package which facilitates both memory control and input/output control for the applications/processes which are executed on the trusted cell 14, as will be further explained below. Trusted processing cell 14 is responsible for loading applications into the other processing cells 15-18, secure cell switching, running secure system services, configuring the hardware to define the accessible memory range for each processing cell, and for all inter-cell communication.

It is optional to allow non-trusted processing cells to be designated as trusted processing cells for purposes of optimization and efficiency. This could be done in any suitable manner such as in, but not limited to, the following examples:

As a first example, once a non-trusted processing cell is confirmed to be accessing only its assigned virtual memory cells (see FIG. 4, Step 43) it could be designated as a trusted processing cell for some period of time or so long as it continues to do so.

As a second example, a set of trusted cell parameters could be stored elsewhere in the memory or in some other location such as a TEE system service library (see FIG. 3) or a separate ROM device (not shown.) A process could be run through trusted processing cell 14 (or any processing cell later defined as trusted) to see if any given non-trusted processing cell meets the parameters for being designated as a trusted processing cell, and if so, designating that non-trusted processing cell a trusted processing cell.

Once processing cells are designated as trusted processing cells, the processes running in those processing cells can be allowed a higher level of system access, be checked for unauthorized operations less often to increase overall processing speed, or any other reasonable adjustment to their operation instituted.

Figure 2:
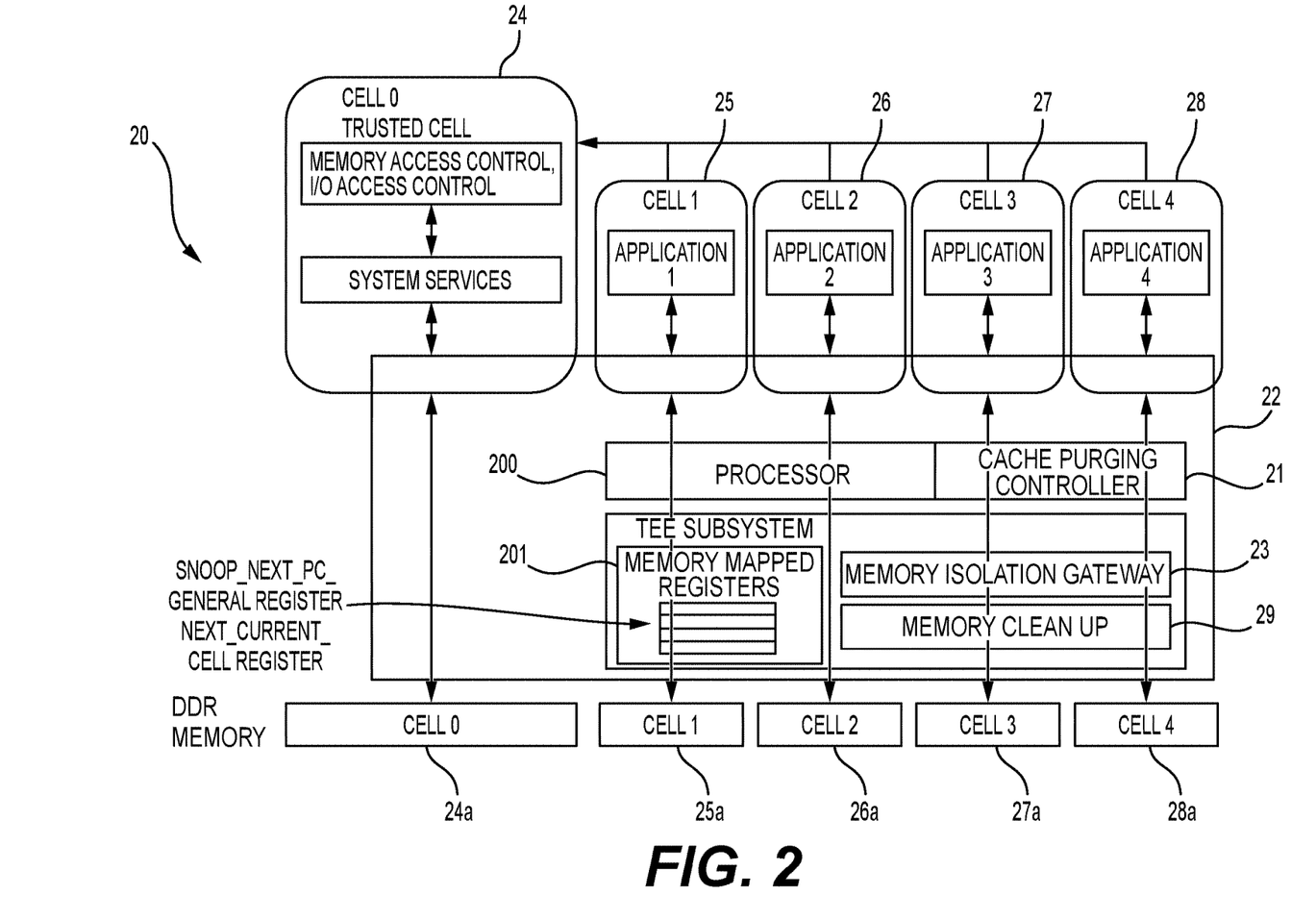
FIG. 2 is an abstract configuration diagram for the memory and processor core of a Hybrid TEE device incorporating the CPC, the MIG, and the MCU.

FIG. 2 shows a more complete Hybrid TEE device configuration. Hybrid TEE device 20 comprises a processor 22 which includes, as with the basic TEE device of FIG. 1, a trusted processing cell 24 and non-trusted processing cells 25, 26, 27, and 28. Also shown are DDR memory cells 24a, 25a, 26a, 27a and 28a which interface with their corresponding processing cells 24-28 to allow the DDR memory cells 24a-28a to be read from and written to by the processing cells 24-28. DDR memory cell 24a corresponds to trusted cell 24, DDR memory cell 25a corresponds to non-trusted processing cell 25, and so forth. Processor 22 does not require privilege level evaluation for code to be executed as code will either be executed on the trusted cell 24, and thus in a TEE, or it will not, as directed by the TEE software. Processor 22 also does not require a physical memory protection feature as the memory used by the device, as described below, will be kept secure in real-time. Trusted processing cell 24 is responsible for loading applications into the other processing cells 25-28, secure cell switching, running secure system services, configuring the hardware to define the accessible memory range for each processing cell, and for all inter-cell communication.

Processor 22 further incorporates cache purging controller ("CPC") 21, memory isolation gateway ("MIG") 23, memory clean up ("MCU") 29, and memory mapped registers 201 as part of TEE Subsystem 200. The functions of each of these elements are as follows:

CPC 21 prevents malware attacks through cache content sneaking.

MIG 23 blocks unexpected memory accesses from executed processes/applications (e.g. Malware).

MCU 29 performs intentional clearing of local variables used by the previous application before cell switching.

Memory mapped registers 201 comprise a simple register mechanism which allows the hardware and the trusted cell 24 to conduct secure cell switching.

The method of use of these elements as part of the Hybrid TEE device is set forth below.

Figure 3:
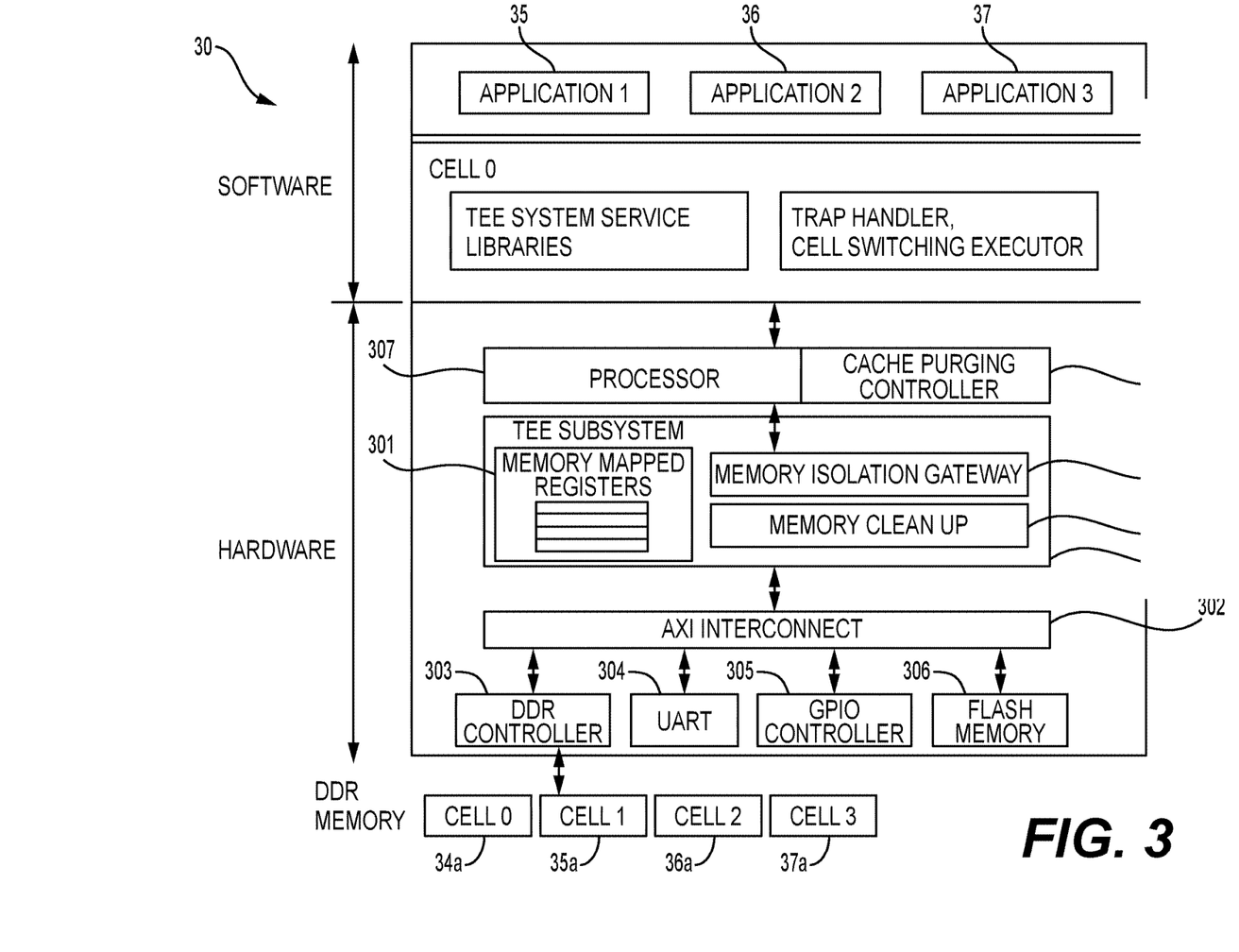
FIG. 3 is an abstract configuration diagram for a second embodiment of the Hybrid TEE device incorporating a CPC, a MIG, and a MCU.
Figure 4:
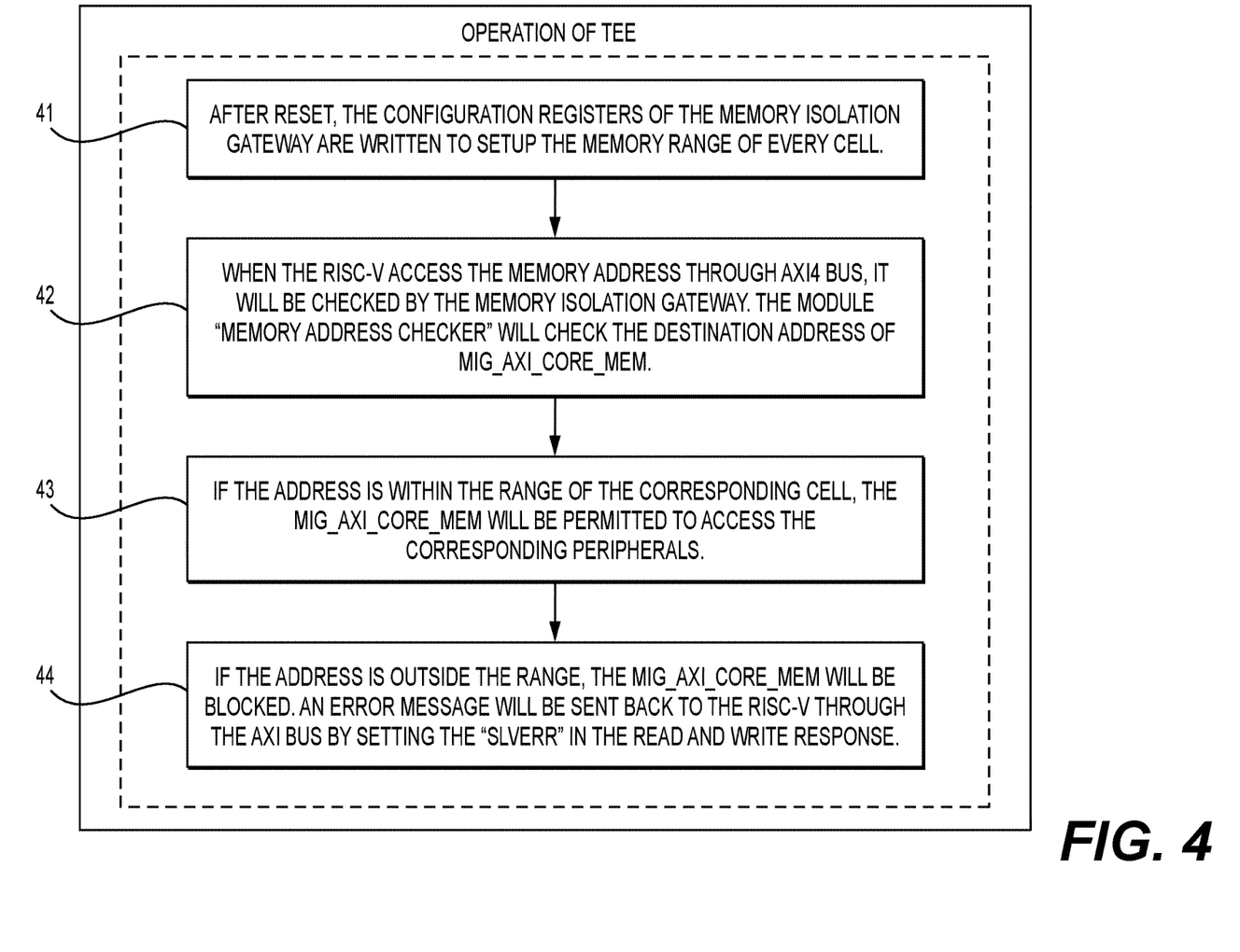
FIG. 4 is a flow chart showing the basic operation flow of the Hybrid TEE device.
Figure 5:
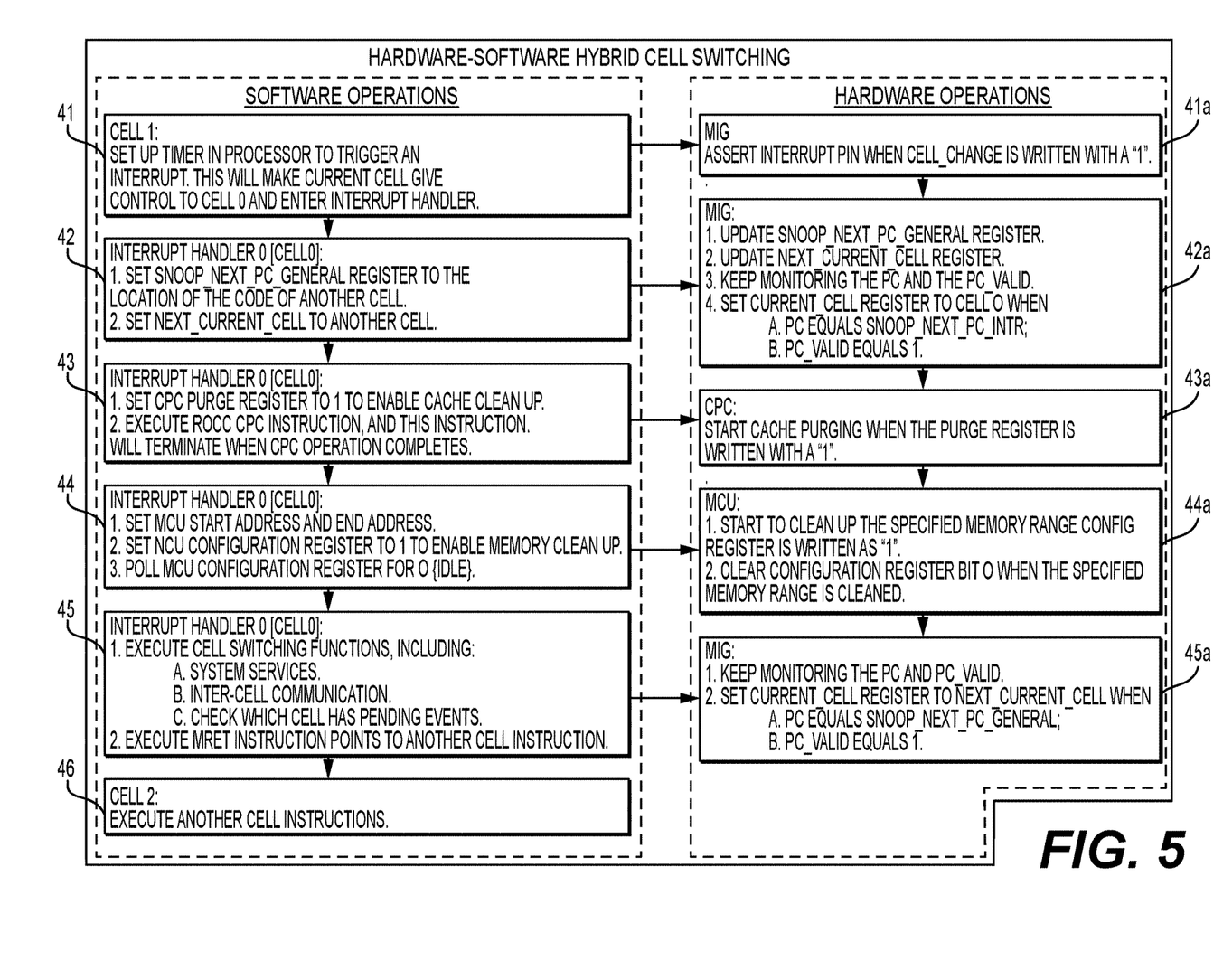
FIG. 5 is a flow chart showing the hardware-software hybrid cell switching of the Hybrid TEE device.

FIG. 3 shows a second embodiment of the invention incorporating elements analogous to those in FIG. 2, and additional elements whose function will be set forth here and in the descriptions of FIGS. 4 and 5. Hybrid TEE device 30 incorporates a processor 307 which is connected to CPC 31. CPC 31 cleans up the processor's cache at appropriate times (see below) to prevent unauthorized (malicious) code from being executed or data being read by cache content sneaking, peeking, overflow, etc. Hybrid TEE device 30 also incorporates MIG 33, which blocks malicious, unauthorized or unexpected memory access by applications. Hybrid TEE device 30 further incorporates MCU 39, which clears all local variables used by an application in a given processing cell before cell switching occurs. Memory mapped registers 301 comprise a register mechanism which allows the hardware and trusted applications executed in trusted processing cell 34. After trusted processing cell 34 allows code and/or data to flow to non-trusted processing cells 35, 36, and 37, applications and/or processes can be executed on those non-trusted processing cells 35-37.

TEE subsystem 300 incorporates memory mapped registers 301, MIG 33, and MCU 39 analogous to the corresponding elements in FIG. 2. Processor 307 communicates with all peripheral devices via TEE subsystem 300, making it impossible for malicious code which can be blocked by the CPC 31, MIG 33, and/or MCU 39 to be executed. After code and/or data pass through TEE Subsystem 300, they reach main bus 302 (here, an Advanced extensible Interface or "AXI" Interconnect). From main bus 302, code and/or data are routed to peripherals such as DDR controller 303, universal asynchronous receiver-transmitter ("UART") 304, General Purpose Input/Output Controller 305, and flash memory 306. Other peripherals such as a wireless networking interface, a hard drive, etc., could also be communicated with through main bus 302.

Each of the processing cells 34-37 is a virtual element that contains both the program code for an application and the data that application needs to execute. Trusted processing cell 34 is responsible for loading applications into the other processing cells 35-37, secure cell switching, running secure system services, configuring the hardware to define the accessible memory range for each processing cell, and for all inter-cell communication. Non-trusted processing cells 35, 36, and 37 execute all other applications and processes, with DDR cell 34a associated with trusted processing cell 34 and DDR memory cells 35a, 36a, and 37a associated with non-trusted processing cells 35, 36, and 37. The processing cells have corresponding DDR memory allocations provided by DDR controller 303, such that trusted processing cell 34 corresponds to DDR memory cell 34a, and non-trusted processing cells 35, 36, and 37 correspond similarly to DDR memory cells 35a, 36a, and 37a.

FIG. 4 shows a flow chart with the basic operating sequence of the Hybrid TEE device.

In first step 41, on power-up or reset the configuration registers of the MIG are written to set up the memory range of every cell.

In second step 42, when the processor (see FIG. 3) accesses a memory address range to retrieve code or data, the communication goes through the MIG, which confirms that the memory address range is within the range of the corresponding DDR memory cell.

In third step 43, if the memory address range is within the range of the corresponding DDR memory cell, the MIG allows the processor to access the memory address range.

In fourth step 44, if the memory address range is not within the range of the corresponding DDR memory cell, the MIG does not allow the processor to access the memory address range and instead returns an error.

FIG. 5 shows a more complete flow chart with the operating sequence of the Hybrid TEE device.

In first software step 41, the TEE system software sets a timer in the processor (see FIG. 3) to trigger an interrupt at the appropriate time or times. This will cause the current processing cell to give control to the trusted processing cell and enter an interrupt handler which is running in the trusted processing cell, which causes the method to move to the next step. In corresponding first hardware step 41a, the MIG will assert an interrupt pin when a cell change flag is set to true, indicating that the current processing cell wants to change or communicate with a DDR memory cell or with another processing cell.

In second software step 42, the interrupt handler in the trusted processing cell sets a general code register, which is part of the memory mapped registers, to the memory address of another processing cell and the location of a next cell register, which is also part of the memory mapped registers, to another target processing cell, and the method continues to the next step. In corresponding second hardware step 42a, the MIG will update the general code register as specified by the second software step, the location of the next cell register as specified by the second software step, and then monitor a PC address and a PC VALID flag. When the PC address is the same as the location of the next cell register and the PC VALID flag is set to true, the current cell register will be set to the trusted processing cell so that the trusted processing cell, via the TEE system software, can validate the current action.

In third software step 43, the interrupt handler running in the trusted processing cell sets a CPC purge flag to true, and executes a CPC instruction to an MCU/CPU enabling a CPC purge which will terminate when the CPC purge operation completes. When the CPC purge operation completes, the method continues to the next step. In corresponding third hardware step 43a, the CPC purges the cache when the CPC purge flag is set to true. It is required that the CPC somehow communicate to the interrupt handler and/or the MCU/CPU when the purge CPC is complete so that the MPU/CPU can terminate the CPC instruction. This could be done by having the CPC set the CPC purge flag to false upon completion of a CPC purge or by any other reasonable means.

In fourth software step 44 the interrupt handler running in the trusted processing cell sets a MCU start address and end address comprising a MCU clean-up address range. The interrupt handler then sets an MCU flag to true to enable a MCU clean-up operation, and begins to poll the MCU flag to detect completion of the MCU operation. Once the MCU flag is set to false, the method continues to the next step. In corresponding fourth hardware step 44a, the MCU executes a clean-up operation and clears the memory designated by the MCU clean-up address range. Once the clean-up operation is complete, the MCU sets the MCU flag to false.

In fifth software step 45, the interrupt handler running in the trusted processing cell executes any requested cell switching functions such as system service functions, inter-cell communication, and checking for processing cells with pending events. The interrupt handler also executes any memory return instruction points associated with other processing cell instructions. The method then continues to the next step. In corresponding fifth hardware step 45a, the MIG 33 continues to monitor the PC address and the PC VALID flag. When the PC address is the same as the location set in the general cell register and the PC VALID flag is set to true, the current cell register will be set to the target processing cell selected in the second software step. This completes the authorization/validation of the application/process/program code/data which the current application is attempting to execute, read, or write.

In sixth software step 46, the Hybrid TEE device executes instructions from the processing cell selected in the second software step, resulting in code being executed and/or data being written to and/or read from the DDR memory. It is not required that there be a corresponding hardware step to sixth step 46.

In an alternate embodiment (not shown) at least one of the CPC, MIG, and the MCU is a separate hardware module interfacing with a processor unit which does not physically incorporate them. This would allow the use of the invention with already-manufactured non-Hybrid TEE processors either as an optional improvement when the device is manufactured or as an upgrade after the device is put into service.

This application, taken as a whole with the abstract, specification, and drawings being combined, provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

Although a few embodiments of the present invention have been shown and described, it would be appreciated by those skilled in the art that changes may be made in this embodiment without departing from the principles and spirit of the invention, the scope of which is defined in the claims and their equivalents. Thus, the breadth and scope of the present invention should not be limited by any of the above exemplary embodiments.

What is claimed is:

1. A hybrid device with trusted execution environment comprising:
   a processor core with a cache purging controller;
   a memory controller communicating with the processor and physical memory controlled by the memory controller;
   one or more peripherals, the peripherals comprising one or more of a general purpose input output controller, a flash memory, or a universal asynchronous receiver-transmitter, the peripherals communicating with the processor core; and
   a trusted execution environment (TEE) subsystem comprising memory mapped registers, a memory isolation gateway and a memory clean up, the TEE subsystem controlling all communication between the processor core and the memory controller and/or the peripherals.

2. The hybrid device with trusted execution environment of claim 1, wherein the memory controller is a DDR memory controller and the physical memory is DDR memory.

3. The hybrid device with trusted execution environment of claim 1, wherein the processor, the cache purging controller, the memory clean-up, and the memory isolation gateway are all integrated into a single integrated circuit device.

4. The hybrid device with trusted execution environment of claim 1, wherein at least one of the cache purging controller, the memory clean-up and the memory isolation gateway are not integrated into an integrated circuit device which integrates the processor core.

5. The hybrid device with trusted execution environment of claim 2, wherein the processor, the cache purging controller, the memory clean-up, and the memory isolation gateway are all integrated into a single integrated circuit device.

6. The hybrid device with trusted execution environment of claim 2, wherein at least one of the cache purging controller, the memory clean-up and the memory isolation gateway are not integrated into an integrated circuit device which integrates the processor core.

7. A method of hardware-software hybrid device with trusted execution environment operation comprising:
- defining at least two virtual processing cells including a trusted processing cell and at least one non-trusted processing cells, the virtual processing cells running on a processor;
- defining at least two virtual memory cells corresponding to at least two areas of a physical memory device according to memory cell configurations stored in a memory isolation gateway;
- assigning one of the virtual memory cells to each of the virtual processing cells;
- monitoring the processor for attempts to access the virtual memory cells due to instructions from one of the virtual processing cells;
- checking via the memory isolation gateway to ensure that the virtual memory cell being accessed by the processor corresponds to the virtual memory cell assigned to the virtual processing cell which provided the instruction to the processor to access the virtual memory cell;
- permitting the processor to access the virtual memory cell if the virtual memory cell corresponds to the virtual processing cell which provided the instruction to the processor to access the virtual memory cell and returning to the monitoring step, otherwise proceeding to the next step;
- blocking via the memory isolation gateway the attempt to access the virtual memory cell and returning an error indicating that the attempt to access the memory was unsuccessful, and returning to the monitoring step.

8. The method of claim 7, wherein a specified non-trusted processing cell becomes a second trusted processing cell after checking via the memory isolation gateway that the virtual processing cell corresponding to the specified non-trusted processing cell is accessing only the virtual memory cell assigned to the specified non-trusted processing cell.

9. The method of claim 7, further comprising:
- defining a set of trusted processing cell parameters;
- storing the set of trusted processing cell parameters in a trusted processing cell parameter memory location;
- confirming that one of the non-trusted processing cells is within the set of trusted processing cell parameters and if so converting that non-trusted processing cell into an additional trusted processing cell; and
- allowing a process to run as a trusted process on the additional trusted processing cell.

10. A method of hardware-software hybrid cell switching comprising:
- defining at least two virtual processing cells including a trusted processing cell and at least one non-trusted processing cell, the new cell being selected from one of the virtual processing cells;
- defining at least two virtual memory cells corresponding to at least two areas of a physical memory device according to memory cell configurations stored in a memory isolation gateway;
- assigning one of the virtual memory cells to each of the virtual processing cells;
- monitoring the processor for attempts to access the virtual memory cells due to instructions from one of the virtual processing cells;
- checking via the memory isolation gateway to ensure that the virtual memory cell being accessed by the processor corresponds to the virtual memory cell assigned to the virtual processing cell which provided the instruction to the processor to access the virtual memory cell;
- permitting the processor to access the virtual memory cell if the virtual memory cell corresponds to the virtual processing cell which provided the instruction to the processor to access the virtual memory cell and returning to the monitoring step, otherwise proceeding to the next step; and
- blocking via the memory isolation gateway the attempt to access the virtual memory cell and returning an error indicating that the attempt to access the memory was unsuccessful;
- setting up a timer in a processor to trigger an interrupt;
- entering an interrupt handler running in a trusted processing cell;
- setting a code register to a location of cell code;
- setting a new cell register to the location of a selected new cell;
- setting a cache purge flag to true;
- executing a cache purging operation with a cache purging controller;
- setting the cache purge flag to false;
- defining a memory clean-up starting address and a memory clean-up ending address to define a memory clean-up range;
- setting a memory clean-up flag to true;
- performing a memory clean-up operation on the memory clean-up range with a memory clean-up;
- performing cell switching functions including system services, inter-cell communication and checking cell pending events;
- executing a memory return instruction to the selected new cell; and,
- executing the instructions provided by the selected new cell.

11. The method of claim 10, wherein the processor, the cache purging controller, and the memory clean-up are all integrated into a single integrated circuit device.

12. The method of claim 10, wherein at least one of the cache purging controller, and the memory clean-up are not integrated into an integrated circuit device which integrates the processor.

13. The method of claim 10, further comprising:
- defining a set of trusted processing cell parameters;
- storing the set of trusted processing cell parameters in a trusted processing cell parameter memory location;
- confirming that one of the non-trusted processing cells is within the set of trusted processing cell parameters and if so converting that non-trusted processing cell into an additional trusted processing cell; and
- allowing a process to run as a trusted process on the additional trusted processing cell.

14. The method of claim 11, further comprising:
- defining a set of trusted processing cell parameters;

storing the set of trusted processing cell parameters in a trusted processing cell parameter memory location;
confirming that one of the non-trusted processing cells is within the set of trusted processing cell parameters and if so converting that non-trusted processing cell into an additional trusted processing cell; and
allowing a process to run as a trusted process on the additional trusted processing cell.

15. The method of claim 12, further comprising:
defining a set of trusted processing cell parameters;
storing the set of trusted processing cell parameters in a trusted processing cell parameter memory location;
confirming that one of the non-trusted processing cells is within the set of trusted processing cell parameters and if so converting that non-trusted processing cell into an additional trusted processing cell; and
allowing a process to run as a trusted process on the additional trusted processing coll.

* * * * *